(12) United States Patent
Meehleder

(10) Patent No.: US 8,254,072 B2
(45) Date of Patent: Aug. 28, 2012

(54) ELECTRICAL LOAD CENTER

(75) Inventor: Steven M. Meehleder, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 329 days.

(21) Appl. No.: 12/612,778

(22) Filed: Nov. 5, 2009

(65) Prior Publication Data

US 2011/0102958 A1    May 5, 2011

(51) Int. Cl.
  *H02H 3/00* (2006.01)
(52) U.S. Cl. .......................................... 361/62; 361/63
(58) Field of Classification Search .............. 361/62–69; 307/18, 52
  See application file for complete search history.

(56) References Cited

U.S. PATENT DOCUMENTS

| | | | |
|---|---|---|---|
| 4,209,818 A | | 6/1980 | Zylstra et al. |
| 4,623,859 A | | 11/1986 | Erickson et al. |
| 4,992,723 A | | 2/1991 | Zylstra et al. |
| 5,016,135 A | | 5/1991 | Zylstra |
| 5,959,819 A | | 9/1999 | Johnson et al. |
| 6,018,203 A | * | 1/2000 | David et al. ............ 307/52 |
| 6,212,049 B1 | | 4/2001 | Spencer et al. |
| 6,532,424 B1 | | 3/2003 | Haun et al. |
| 6,778,369 B2 | | 8/2004 | Perichon |
| 6,788,508 B2 | | 9/2004 | Papallo, Jr. et al. |
| 7,095,134 B2 | * | 8/2006 | Sauer et al. ............ 307/10.1 |
| 7,852,605 B2 | * | 12/2010 | Hill ............................. 361/2 |
| 2002/0097542 A1 | | 7/2002 | Perichon |

* cited by examiner

*Primary Examiner* — Danny Nguyen
(74) *Attorney, Agent, or Firm* — Nixon Peabody LLP

(57) ABSTRACT

A low voltage DC power supply is provided in a load center for distributing electrical power from electrical power utility lines to multiple branch circuits via a load center bus connected to the utility lines, each of the branch circuits having a circuit breaker coupled to a processor that is shared by multiple circuit breakers in the load center. The low voltage DC power supply includes a switch mode low voltage power supply connected to the processor for supplying the processor with a DC power input, and a line-derived power supply and a fault-derived power supply coupled between the utility and the switch mode power supply for supplying DC inputs to the switch mode power supply. The magnitude of electrical current supplied to the multiple branch circuits from the load center bus is determined by producing signals representing the current levels in the bus at successive locations on opposite sides of each connection of the bus to the multiple branch circuits, and determining the current supplied to each branch circuits from those signals.

19 Claims, 2 Drawing Sheets

ELECTRICAL LOAD CENTER

FIELD OF THE INVENTION

The present invention relates generally to load centers for distributing electrical power from electrical power utility lines to multiple branch circuits via a load center bus connected to the utility lines, and in which each of the branch circuits has a circuit breaker coupled to a signal processor that is shared by all the circuit breakers in the load center. More particularly, this invention relates to improved low voltage DC power supplies and improved current monitoring for such load centers and/or determining the currents supplied to the different branch circuits in such load centers.

BACKGROUND

To leverage line current and ground fault sensing in a load center capable of tripping circuit breakers in response to the detection of arcing faults, ground faults and overloads using signal processing, an inherently reliable technique is required to power the signal processing and tripping functions. The efficiency of the load center can be improved if the signal processor can also be used to monitor the currents in the multiple branch circuits.

To reduce the cost of such load centers, it would be desirable to use the signal processor to determine the currents supplied to the different branch circuits from the load center bus.

BRIEF SUMMARY

The present disclosure provides a low voltage DC power supply for a signal processor in a load center for distributing electrical power from electrical power utility lines to multiple branch circuits via a load center bus connected to said utility lines, each of the branch circuits having a circuit breaker coupled to the signal processor, which is shared by all the circuit breakers in the load center. The low voltage DC power supply includes a switch mode low voltage power supply connected to the processor for supplying the processor with a DC power input, and a line-derived power supply and a fault-derived power supply coupled between the utility and the switch mode power supply for supplying first and second DC inputs to the switch mode power supply. The line-derived power supply includes a step-down transformer connected to the utility lines for producing a stepped-down AC voltage, and a rectifier for converting the stepped-down voltage to a first DC power input for the switch mode low voltage power supply. The fault-derived power supply includes a pair of current transformers on the utility lines for producing alternating signals proportional to the currents flowing in the utility lines connected to the load center bus, and rectifiers for converting the alternating signals produced by the current transformers to a second DC power input for the switch mode low voltage power supply.

The present disclosure also provides a load center for distributing electrical power from electrical power utility lines to multiple branch circuits via a load center bus that includes detectors for producing signals representing the current levels in the bus at successive locations on opposite sides of each connection of the bus to the multiple branch circuits and supplying those signals to the signal processor. The signals are used by the signal processor to determine the current supplied to each of said branch circuits. In one implementation, each branch circuit includes a circuit breaker, and the signal processor produces trip signals for all the circuit breakers.

In one specific embodiment, the signal processor is programmed to determine the difference between pairs of the signals representing the current levels on opposite sides of each connection of the load center bus to the multiple branch circuits, and those differences represent the currents supplied from the bus to each of the branch circuits.

One advantage that can be realized with certain embodiments of this invention is that the use of both a fault-derived low voltage power supply from the AC supply lines in the load center for overcurrent protection, and a line-voltage-derived low voltage power supply for arcing-fault and ground-fault protection, addresses both energy supplies driving the need for protection. Another advantage that can be realized is the elimination of traditional current and/or thermal sensors.

BRIEF DESCRIPTION OF THE DRAWINGS

The invention may best be understood by reference to the following description taken in conjunction with the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
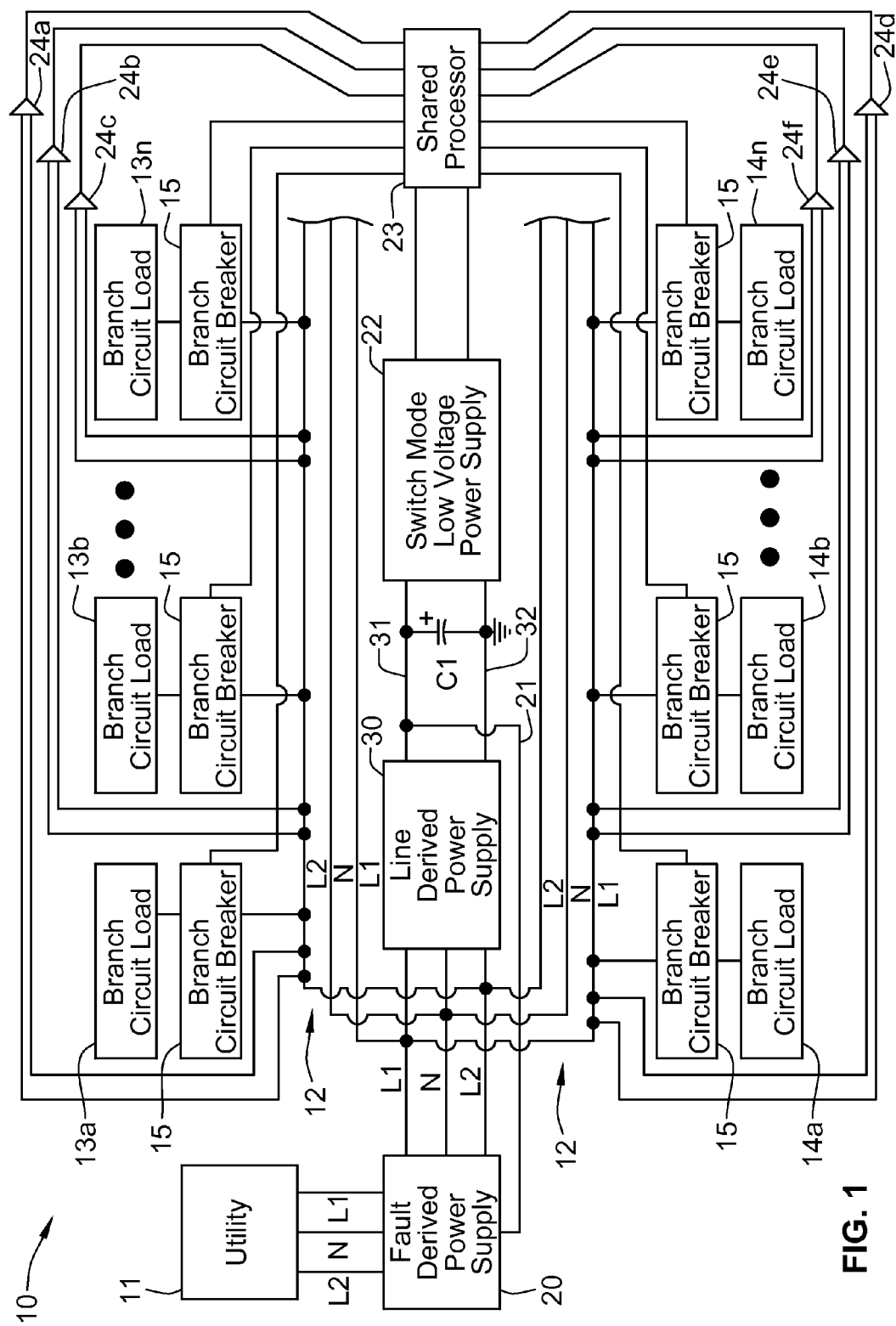
FIG. 1 is a block diagram of a load center system having a signal processor that is shared by the multiple branch circuits and their respective circuit breakers.

Turning now to the drawings and referring first to FIG. 1, a load center 10 receives power from a standard set of power lines L1, L2 and N connected to corresponding lines from a utility 11. Within the load center 10, the lines L1, L2 and N are connected to a load center bus 12 which in turn is connected to multiple branch circuits 13a through 13n and 14a through 14n for supplying power to various loads distributed throughout the building serviced by the load center. Specifically, branch circuits 13a-13n are connected to line L2 of the bus 12, and branch circuits 14a-14n are connected to line L1 of the bus 12. Each of the branch circuits includes a circuit breaker 15 connected between the bus 12 and the load(s) in the corresponding branch circuit.

As depicted in FIG. 1, a fault-derived power supply 20 is coupled to the power lines upstream of the branch circuits for supplying power via line 21 to a low voltage DC power supply 22, such as a switch mode power supply. The power supply 22 produces a 3-volt DC output for powering electronic control circuitry that includes a signal processor 23 within the load center 10.

The processor 23 receives signals related to the currents flowing in the different branch circuits and produces trip signals for the appropriate individual circuit breakers when the processor 23 determines that a fault condition has occurred. The processor 23 is shared by all the circuit breakers 15 so that it is not necessary to replicate the circuitry for the multiple breakers in the multiple branch circuits. The use of both a fault-derived low voltage power supply from the AC supply lines for overcurrent protection, and a line-voltage-derived low voltage power supply for arcing-fault and ground-fault protection, addresses both energy supplies driving the need for protection.

In the illustrative embodiment of FIG. 1, the currents supplied to the different branch circuits are determined from signals representing the current levels in the bus 12 at successive locations on opposite sides of each connection of the bus to the multiple branch circuits. In FIG. 1, these signals are produced by operational amplifiers 24a-24f, each of which receives a differential input voltage from a different location on line L1 or L2 of the bus 12. For example, the inputs of the amplifier 24a are connected to two spaced points on line L2 just before the connection of line L2 to the branch circuit 13a, so the differential input voltage to the amplifier 24a is the voltage drop between those two spaced points. The amplifier 24a produces an output voltage proportional to the differential input voltage, and that output signal is supplied to the processor 23 where internal analog-to-digital converters convert the voltage to a digital signal that represents the current level in line L2 just before the connection to the branch circuit 13a.

The output signals produced by the operational amplifiers 24a-24f represent the voltage drops across selected segments of the load center bus 12 on opposite sides of each connection of the bus to the multiple branch circuits. The resistance of each segment is a known constant, so the current level in each segment is directly proportional to the detected voltage drop across that segment, which is represented by the output of the operational amplifier connected to that segment. Thus, the current supplied to any given branch circuit is the difference between the currents measured in the bus 12 on opposite sides of the bus connection to that branch circuit. For example, the difference between the output signals of the two operational amplifiers 24a and 24b represents the current drawn by the branch circuit 13a from line L2 of the bus 12.

The signal processor 23 is programmed to compute the difference between the various pairs of current measurements, in each of the lines L1 and L2, on opposite sides of the bus connections to all the branch circuit connections, to determine the current drawn by each separate branch circuit. These current levels are then used by the processor 23 to detect the occurrence of fault conditions in the individual branch circuits, and to generate a trip signal for the circuit breaker 15 in the particular branch circuit in which the fault occurred.

Downstream of the connection of the lines L1, L2 and N to the load center bus 12, a line-derived power supply 30 is coupled to the lines L1, L2 and N for supplying power via lines 31 and 32 and a capacitor C1 to the low voltage DC power supply 22. This arrangement of dual power supplies for the low voltage power supply 22 ensures that power will be supplied to the circuitry 23 during the occurrence of a variety of different fault conditions. For example, when a fault does not substantially reduce the voltage on the load center bus, such as when an arcing fault or ground fault occurs, the line-derived power supply 30 continues to power the low voltage power supply 22. But when a fault such as a short circuit or overload occurs, the voltage on the load center bus collapses, but the fault-derived power supply 20 uses the resulting high current flow to power the low voltage power supply 22.

Figure 2:
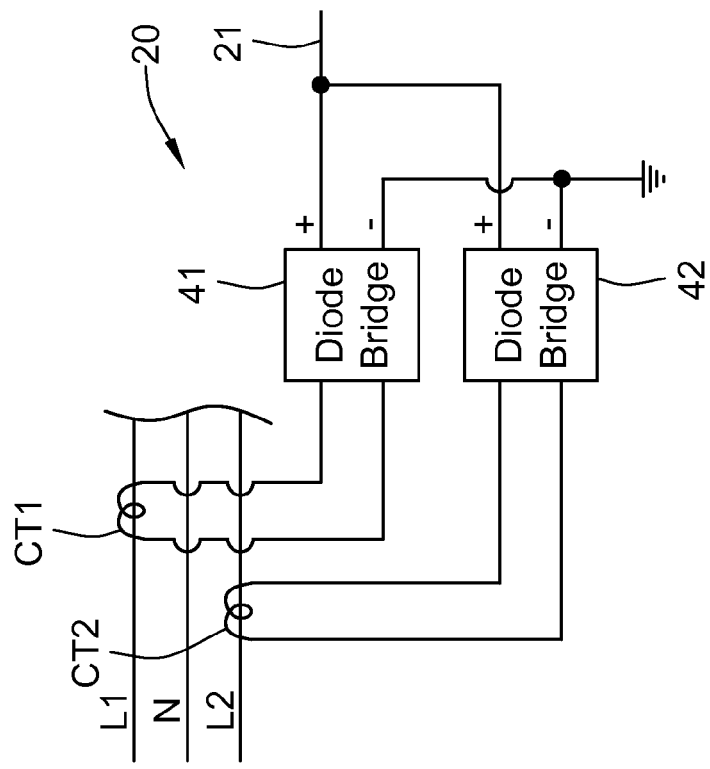
FIG. 2 is an electrical circuit diagram for the fault-derived power supply in the load center system of FIG. 1.

FIG. 2 is a more detailed electrical circuit diagram of one embodiment of the fault-derived power supply 20 for the low voltage DC power supply in the system of FIG. 1. A pair of current transformers CT1 and CT2 are coupled to the utility power lines L1 and L2, respectively. The signals induced in the current transformers CT1 and CT2 are supplied to a pair of diode-bridge rectifiers 41 and 42 to convert the AC signals from the current transformers to a DC output voltage on line 21. During normal operation of the load center, when no faults have occurred, the currents induced in the current transformers CT1 and CT2 are sufficiently low that the DC output on line 21 is negligible. When a type of fault occurs that produces a larger current flow in line L1 and/or L2, the DC output voltage on line 21 increases, thereby ensuring the supply of adequate power to the switch mode power supply 22.

Figure 3:
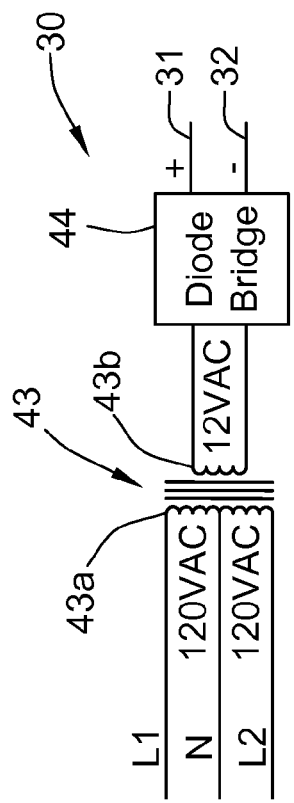
FIG. 3 is an electrical circuit diagram for the line-derived power supply in the load center system of FIG. 1.

FIG. 3 is a more detailed electrical circuit diagram of one embodiment of the line-derived power supply for the low voltage DC power supply in the system of FIG. 1. The primary winding 43a of a step-down transformer 43 is connected between lines L1 and L2, producing a voltage of about 12 volts across the secondary winding 43b of the transformer. The secondary winding 43b is connected to a diode-bridge rectifier 44 to convert the AC signals from the transformer 43 to a DC output voltage across lines 31 and 32. This DC output is smoothed by a capacitor C1 before being applied to the input of the switch mode power supply 22. This is the power input to the power supply 22 during normal operation of the load center, i.e., when the DC output on line 21 from the fault-derived power supply 20 is negligible.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. In a load center for distributing electrical power from electrical power utility lines to multiple branch circuits via a load center bus connected to said utility lines, each of the branch circuits having a circuit breaker coupled to a signal processor that is shared by all of the circuit breakers of the multiple branch circuits, a low voltage DC power supply comprising:

a switch mode low voltage power supply connected to said processor for supplying said processor with a DC power input, and a line-derived power supply and a fault-derived power supply coupled between said utility and said switch mode power supply for supplying DC inputs to said switch mode power supply, said line-derived power supply including a step-down transformer coupled to the utility lines for producing a stepped-down AC voltage, and a rectifier for converting said stepped-down AC voltage to a first DC power input for said switch mode low voltage power supply, and said fault-derived power supply including a pair of current transformers on said utility lines for producing alternating signals proportional to the currents flowing in the utility lines connected to the load center bus, and rectifiers for converting the alternating signals produced by said current transformers to a second DC power input for said switch mode low voltage power supply.

2. The load center of claim 1 in which said rectifier in said line-derived power supply comprises a diode bridge for converting said stepped-down AC voltage to said first DC power input.

3. The load center of claim 1 in which said rectifiers in said fault-derived power supply comprise diode bridges for converting said alternating voltages from said current transformers to said second DC power input.

4. The load center of claim 1 which includes detectors coupled to said load center bus for producing signals representing the current levels in said bus at successive locations corresponding to the connections of said bus to said multiple branch circuits and supplying said signals to said signal processor, and said signal processor is programmed to use said signals to determine the current supplied to each of said branch circuits.

5. The load center of claim 4 in which said signal processor is programmed to detect ground fault, arcing fault, overload and short circuit conditions in said branch circuits.

6. The load center of claim 4 in which said signal processor is programmed to detect at least two of: ground fault, arcing fault, overload and short circuit conditions in said branch circuits.

7. A load center for distributing electrical power from electrical power utility lines to multiple branch circuits, the load center comprising:
   a load center bus connecting said utility lines to said multiple branch circuits,
   multiple circuit breakers, at least one of the circuit breakers in each of said branch circuits,
   multiple detectors coupled to said load center bus and producing signals representing the current levels in said bus at successive locations on opposite sides of each connection of said bus to said multiple branch circuits, and
   a signal processor receiving said signals produced by said detectors and programmed to use said signals to determine the current supplied to each of said branch circuits, said signal processor producing trip signals for all said circuit breakers,
   wherein said detectors comprise multiple operational amplifiers, each of said amplifiers having a pair of inputs connected to opposite ends of a selected segment of said load center bus so that the operational amplifier receives a differential voltage across said segment and produces a signal representing the magnitude of the current flow through said segment.

8. The load center of claim 7 in which said signal processor is programmed to determine the difference between pairs of said signals representing the current levels on opposite sides of each connection of said bus to said multiple branch circuits, said differences representing the currents supplied from said bus to each of said branch circuits.

9. A method of supplying low voltage DC power to a signal processor in a load center for distributing electrical power from electrical power utility lines to multiple branch circuits via a load center bus, each of the branch circuits having a circuit breaker coupled to said signal processor, said method comprising:
   supplying said signal processor with a DC power input from a switch mode low voltage power supply, and
   supplying DC inputs to said switch mode power supply from a line-derived power supply and a fault-derived power supply coupled between said utility and said switch mode power supply,
   producing a stepped-down AC voltage from said utility lines in said line-derived power supply, and converting said stepped-down AC voltage to a first DC power input for said switch mode low voltage power supply, and
   producing alternating signals proportional to the currents flowing in the utility lines connected to the load center bus in said fault-derived power supply, and converting the alternating signals produced by said current transformers to a second DC power input for said switch mode low voltage power supply.

10. The method of claim 9 which includes producing signals representing the current levels in said load center bus at successive locations corresponding to the connections of said bus to said multiple branch circuits and supplying said signals to said signal processor, and using said signals in said signal processor to determine the current supplied to each of said branch circuits.

11. The method of claim 10 which includes using said signals in said signal processor to detect ground fault, arcing fault, overload and short circuit conditions in said branch circuits.

12. The method of claim 10 which includes using said signals in said signal processor to detect at least two of: ground fault, arcing fault, overload and short circuit conditions in said branch circuits.

13. A method of determining the magnitude of electrical current supplied to multiple branch circuits from a load center bus in a load center connected to electrical power utility lines, said method comprising:
   producing, via multiplersm signals representing the current levels in said bus at successive locations on opposite sides of each connection of said bus to said multiple branch circuits, each of said operational amplifiers having a pair of inputs connected to opposite ends of a selected segment of said load center bus so that the operational amplifier receives a differential voltage across said segment and produces a signal representing the magnitude of the current flow through said segment; and
   determining, via a signal processor receiving said signals produced by said amplifiers, the current supplied to each of said branch circuits from said signals.

14. The method of claim 13 in which said signals represent the voltage drops across selected segments of said load center bus on opposite sides of each connection of said bus to said multiple branch circuits.

15. The method of claim 13 which includes determining the difference between pairs of said signals representing the current levels on opposite sides of each connection of said bus to said multiple branch circuits, said differences representing the currents supplied from said bus to each of said branch circuits.

16. The method of claim 13 further comprising detecting, via the signal processor from said signals received from said amplifiers, at least one of a ground fault condition, an arcing fault condition, an overload condition, or a short circuit condition, and, responsive to the detected at least one condition, outputting one or more trip signals to one or more of said circuit breakers.

17. The load center of claim 7 further comprising a switch mode low voltage power supply connected to said processor for supplying said processor with a DC power input, and a line-derived power supply and a fault-derived power supply coupled between said utility and said switch mode power supply for supplying DC inputs to said switch mode power supply.

18. The load center of claim 17 in which said line-derived power supply includes a step-down transformer coupled to the utility lines for producing a stepped-down AC voltage, and a rectifier for converting said stepped-down AC voltage to a first DC power input for said switch mode low voltage power supply.

19. The load center of claim 17 in which said fault-derived power supply including a pair of current transformers on said utility lines for producing alternating signals proportional to the currents flowing in the utility lines connected to the load center bus, and rectifiers for converting the alternating signals produced by said current transformers to a second DC power input for said switch mode low voltage power supply.

* * * * *